April 29, 1924.

J. A. JOHNSON

PNEUMATIC VEHICLE TIRE

Filed May 28, 1920

1,491,864

INVENTOR:
John A. Johnson,
By Frank W. Woerner,
ATTORNEY.

Patented Apr. 29, 1924.

1,491,864

UNITED STATES PATENT OFFICE.

JOHN A. JOHNSON, OF INDIANAPOLIS, INDIANA.

PNEUMATIC VEHICLE TIRE.

Application filed May 26, 1920. Serial No. 384,833.

*To all whom it may concern:*

Be it known that I, JOHN A. JOHNSON, a citizen of the United States, residing at Indianapolis, in the county of Marion and State of Indiana, have invented certain new and useful Improvements in Pneumatic Vehicle Tires, of which the following is a specification.

This invention relates to certain improvements in pneumatic vehicle tires; and one of the objects of the invention consists in the provision of pneumatic tire casings of the above character having independently formed flexible treads so that when the tire treads have become sufficiently worn to unfit them for further use, and before the tire casings have been subjected to wear, the worn treads can easily and conveniently be removed and replaced with new treads, thereby greatly prolonging the life of the more expensive tire casings.

A further object of the invention consists in the provision of pneumatic tire casings for pleasure vehicles having independently formed treads which may be replaced when worn, the casings retaining to a large degree the benefits and advantages associated with the use of pneumatic tires.

A still further object of the invention consists in the provision of tire casings having independently formed flexible treads for use on pleasure vehicles, which treads may be removed at the will of the operator and be replaced with non-puncturable metal shields, which add rigidity, strength and increased capacity for sustaining loads, so that the range of utility of the casings is extended and used on wheels of light commercial vehicles, and also to heavy truck work, and vice versa.

The advantages and benefits derived from the use of a convertible pneumatic tire casing as above enumerated, in addition to those which may appear from a perusal of the following description and claims, are attained by means of the construction illustrated in the accompanying drawings, forming a part hereof, in which—

Figure 1:
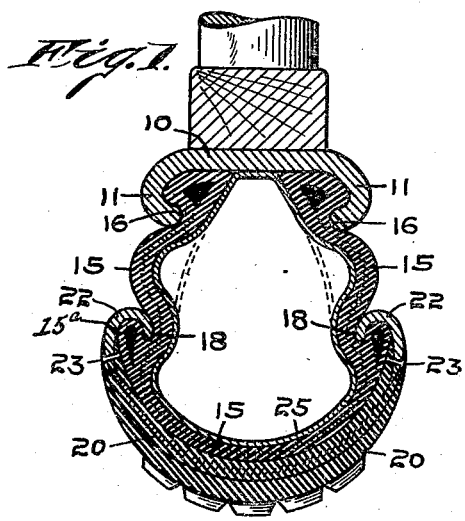
Figure 2:
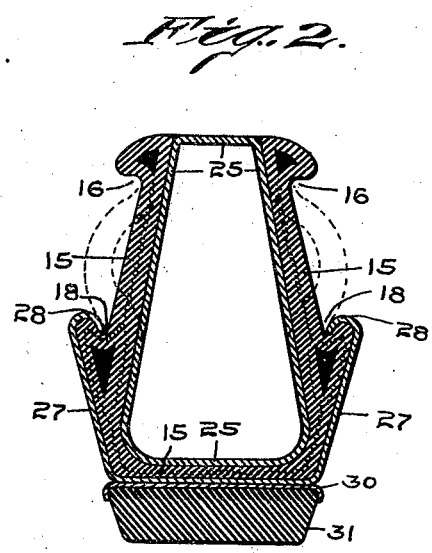
Figure 3:
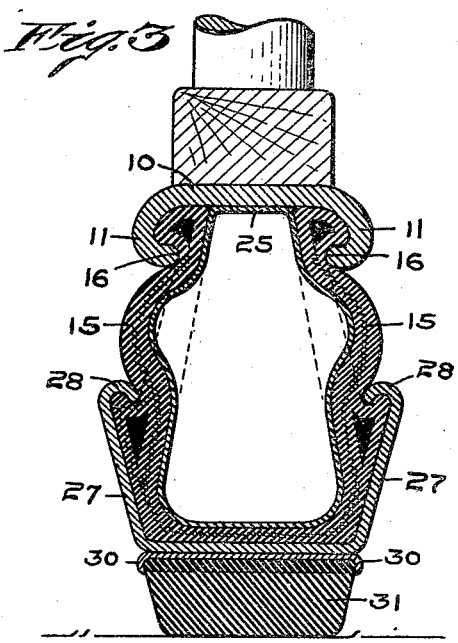
Figure 4:
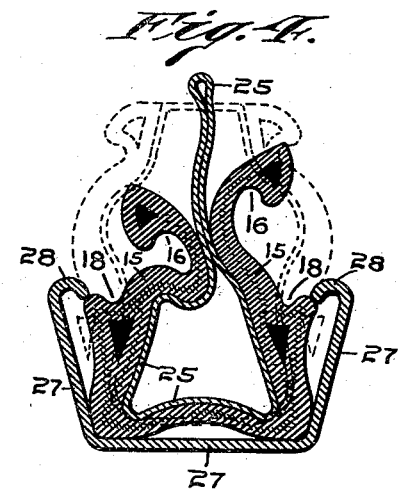

Figure 1 is a cross section of my improved pneumatic vehicle tire, showing the independently formed flexible tread occupying operative position when in use upon a pleasure vehicle. Fig. 2 is a cross section of the tire casing in a deflated condition, showing the substitution of a light gage metal shield for use on light commercial vehicles. Fig. 3 is a view similar to Fig. 2 except that it exemplifies the use of a heavier metal shield for use on heavy motor trucks. Fig. 4 illustrates a view of the tire compressed as when the same is introduced or removed from the tread and shield.

Referring to the drawings, 10 represents the usual metallic wheel rim the side edges of which terminate in clincher flanges 11 which engage the well known channels in the external side walls of the casing. 15 represents the casing which, as usual, is built up of a plurality of layers of fabric or cords, the same being overlaid with rubber to complete the casing structure. In addition to the usual channels 16 which are formed near the free edges of the casing 15, for receiving the clincher flanges 11, the said casing is additionally provided with the annular ribs 15$^a$ which are arranged along the central portion between the crown and base to form channels 18, and these channels provide a means for the attachment of an independently formed "shoe" or tread 20, which removes the frictional ground wear from casing 15 and which may be replaced when worn down to a predetermined degree. Tread 20 is built up similarly to casing 15 by means of several layers of fabric or cords, except that the peripheral part of the casing is more heavily covered with rubber so as to improve the wearing quality of its face. During the building up of tread 20 the clincher flanges 22 are laid in along the edges and are annealed to the surrounding material when the tread is baked. To further strengthen the joints and reduce the liability of accidental separation of the clincher flanges 22 and tread 20 the parts are further secured together by passing a series of rivets 23 transversely through the overlapped edges of the fabric and the clincher flanges. When casing 15 is inflated, through the medium of the inner air-holding tube 25, casing 15 and tread 20 are held tightly together, and as the tread is built up of pliable material it rapidly lends itself to the varying momentary diametrical changes of the casing when in action, so that the desired resiliency associated with the use of pneumatic tires is largely retained. When tread 20 has become worn to be unfit for further service casing 15 may be deflated and the worn tread removed and replaced with another.

The above mentioned replaceable character of tread 20 is a very desirable and beneficial construction, but my invention is susceptible to a wider range of utility, in that casing 15, which may be in use on a pleasure vehicle, can readily be converted for use and perform its normal functions on a light commercial vehicle wheel, and may be further extended for use on a wheel for heavy truck duty. This convertibility of casing 15 I accomplish by removing the flexible tread 20 heretofore described and substituting therefor a shield 27 which is preferably composed of comparatively thin sheet steel and which has a channeled formation in cross section and into this channel the outer peripheral portion of casing 15 is inserted, as clearly shown in the drawings. The marginal edges of shield 27 terminate in the clincher flanges 28, which engage the channels 18, previously occupied by the clincher flanges 22. Shield 27 not only adds rigidity and strength to casing 15 and serves to sustain the latter under the increased weight of the load, when in use on a commercial truck, but additionally protects the casing against innumerable kinds of foreign objects which are apt to cut, bruise and puncture an unprotected casing.

The utilization of casing 15 may be further extended in converting it for use on wheels for heavy truck duty. This adaptation or convertibility is exemplified in Fig. 3 where, as shown, shield 27 is formed of heavier material than that shown in Fig. 2 which so additionally reinforces and strengthens casing 15 so as to enable it to withstand the increased action of applied strains to which truck wheels are subjected.

The peripheral face of shield 27 forms a base for supporting the usual tread rim 30 and rubber-faced tread 31.

It will be observed from the foregoing description that the casing 15 lying between the clincher flanges 11, 22 and 28 is not influenced by the reinforcing effect of rim 10, tread 20 and shield 27, so that the desirable resiliency accompanying the use of pneumatic tires is largely retained in my present structure.

Having thus fully described my said invention, what I desire to secure by Letters Patent, is—

1. A vehicle tire comprising a casing provided with a portion adjacent a rim for detachably connecting the tire with the rim, the inner walls of said casing diverging outwardly and extending in substantially straight lines from the said portion adjacent the rim to a point substantially adjacent the tread of the casing to form a tread surface of greater width than the said portion adjacent the rim, said casing having on its opposite exterior walls thickened portions forming annular ribs substantially midway from the tread surface to the rim portion, the exterior walls of the casing converging inwardly from the ribs to the tread, a shoe for protecting the tread surface of the casing and formed with clincher flanges which extend inwardly and over the ribs to cooperate therewith in securing the shoe on the casing and to direct abnormal stresses away from the ribs as the casing flattens under excessive loads, said shoe being shaped to lie in contact with the tread portion and side walls of the casing, the portions of the casing between the ribs and the rim portion permitting bulging under the load from the tread portion, substantially as set forth.

2. In combination with a clincher wheel rim a pneumatic tire casing having means for detachably connecting the casing with the rim, an annular rib extending along each side and substantially intermediate of the crown and edges of the casing, a shoe for protecting the crown of the casing and provided with clincher flanges extending inwardly and around the ribs and loosely engaging the ribs to hold the shoe on the casing and to direct abnormal stresses away from the ribs as the casing flattens under excessive loads, said shoe being shaped to lie in contact with the tread portion and side walls of the casing, the casing having its opposite walls converging inwardly from the ribs to the rim, the portions of the casing between the ribs and the rim portion permitting bulging under the load from the tread portion, substantially as set forth.

In witness whereof, I have hereunto set my hand and seal at Indianapolis, Indiana, this 18th day of May, A. D. one thousand nine hundred and twenty.

JOHN A. JOHNSON. [L. S.]